United States Patent
Zhou (10) Patent No.: US 8,928,765 B2
(45) Date of Patent: Jan. 6, 2015

(54) NOISE REDUCTION BASED ON MOTION SENSORS

(71) Applicant: Apple Inc., Cupertino, CA (US)

(72) Inventor: Jianping Zhou, Fremont, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 13/630,961

(22) Filed: Sep. 28, 2012

(65) Prior Publication Data

US 2013/0329063 A1 Dec. 12, 2013

Related U.S. Application Data

(60) Provisional application No. 61/657,709, filed on Jun. 8, 2012.

(51) Int. Cl.
*H04N 5/228* (2006.01)
*G06K 9/36* (2006.01)
*H04N 5/232* (2006.01)

(52) U.S. Cl.
CPC .................................. *H04N 5/23254* (2013.01)
USPC ....................... 348/208.6; 348/208.4; 382/276

(58) Field of Classification Search
CPC .......... H04N 5/23248; H04N 5/23258; H04N 5/23254; H04N 5/23267; H04N 5/23277; G06T 2207/20201
USPC ..................... 348/208.4, 208.6; 382/276–308
See application file for complete search history.

(56) References Cited

U.S. PATENT DOCUMENTS

| | | | |
|---|---|---|---|
| 8,310,553 B2 * | 11/2012 | Matsunaga | 348/208.99 |
| 2010/0079605 A1 | 4/2010 | Wang et al. | |
| 2011/0169960 A1 | 7/2011 | Wagner | |
| 2011/0211082 A1 * | 9/2011 | Forssen et al. | 348/208.2 |
| 2011/0298942 A1 | 12/2011 | Uchida et al. | |
| 2012/0069203 A1 * | 3/2012 | Voss et al. | 348/208.1 |
| 2013/0235221 A1 * | 9/2013 | Zhou | 348/208.6 |
| 2013/0329066 A1 * | 12/2013 | Zhou et al. | 348/208.99 |
| 2014/0071299 A1 * | 3/2014 | Grundmann et al. | 348/207.1 |

* cited by examiner

*Primary Examiner* — Sinh Tran
*Assistant Examiner* — Shahbaz Nazrul
(74) *Attorney, Agent, or Firm* — Kenyon & Kenyon, LLP (57) ABSTRACT

A method for reducing noise in a sequence of frames may include generating a transformed frame from an input frame according to a perspective transform of a transform matrix, wherein the transform matrix corrects for motion associated with input frame. A determination may be made to identify pixels in the transformed frame that have a difference with corresponding pixels in a neighboring frame below a threshold. An output frame may be generated by adjusting pixels in the transformed frame that are identified to have the difference with the corresponding pixels in the neighboring frame below the threshold.

36 Claims, 8 Drawing Sheets

NOISE REDUCTION BASED ON MOTION SENSORS

PRIORITY CLAIM

The present application claims priority to U.S. Provisional Application No. 61/657,709, filed on Jun. 8, 2012, the entirety of which is incorporated by reference herein.

BACKGROUND

This disclosure relates generally to the field of image and video processing. More specifically, this disclosure relates to reducing temporal noise in captured video using motion sensor data.

Today, many personal electronic devices come equipped with digital image sensors that are video capable. Exemplary personal electronic device of this sort include, but are not limited to, mobile telephones, personal digital assistants, portable music and video players and portable computer systems such as laptop, notebook and tablet computers. Many lower cost, high resolution cameras such as those utilized in compact, portable personal electronic devices are equipped with low-cost, low-power, CMOS sensors that can potentially geometrically distort captured images if there is movement of the device or the object being imaged while the CMOS sensor is capturing the scene.

Some video capture devices now include on board motion sensors, i.e., positional sensors (e.g., accelerometers and/or gyrometers), which may be used to assist in various device functions. For example, some devices may use gyrometer data to aid in image stabilization by appropriately adjusting the device's lens and/or sensor mechanism before an image or frame is captured.

The capture and processing of video may result in the introduction of noise that may be visible as artifacts in the subsequently displayed video. Accordingly, there is a need for techniques to reduce the noise related distortion during image and video capture in devices utilizing CMOS or other non-CCD image sensors.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Embodiments of the present invention provide techniques and devices for reducing noise in frames of an image or video sequence. The noise may be present due to camera characteristics (e.g., image sensor quality) or scene conditions (e.g., low light conditions or camera motion). Data from positional sensors in communication with the image capture device may reduce such noise in the captured frames. The data from positional sensors to generate a perspective transformation of the captured image data. The transformed image reduce the effect of noise on the captured frame. Using data from positional sensor to reduce the effect of noise can overcome real time constraints present with traditional image processing techniques used to reduce noise.

In one embodiment, the method for reducing noise in a sequence of frames may include generating a transformed frame from an input frame according to a perspective transform of a transform matrix, wherein the transform matrix corrects for motion associated with input frame. A determination may be made to identify pixels in the transformed frame that have a difference with corresponding pixels in a neighboring frame below a threshold. An output frame may be generated by adjusting pixels in the transformed frame that are determined to have the difference with the corresponding pixels in the neighboring frame below the threshold.

In another embodiment, the noise reduction techniques may include acquiring motion data from a positional sensor in communication with an image capture device. A 2D-perspective transform matrix may be calculated for the captured frame based on motion data and camera parameters. The calculated perspective transform matrix may be applied to the frame to generate a corrected frame. The corrected frame may be compared to a neighboring frame to identify edges and the edges may be used to merge pixels of the corrected frame and the neighboring frame. The plurality of merged pixels may be combined to provide a corrected output image.

Figure 1:
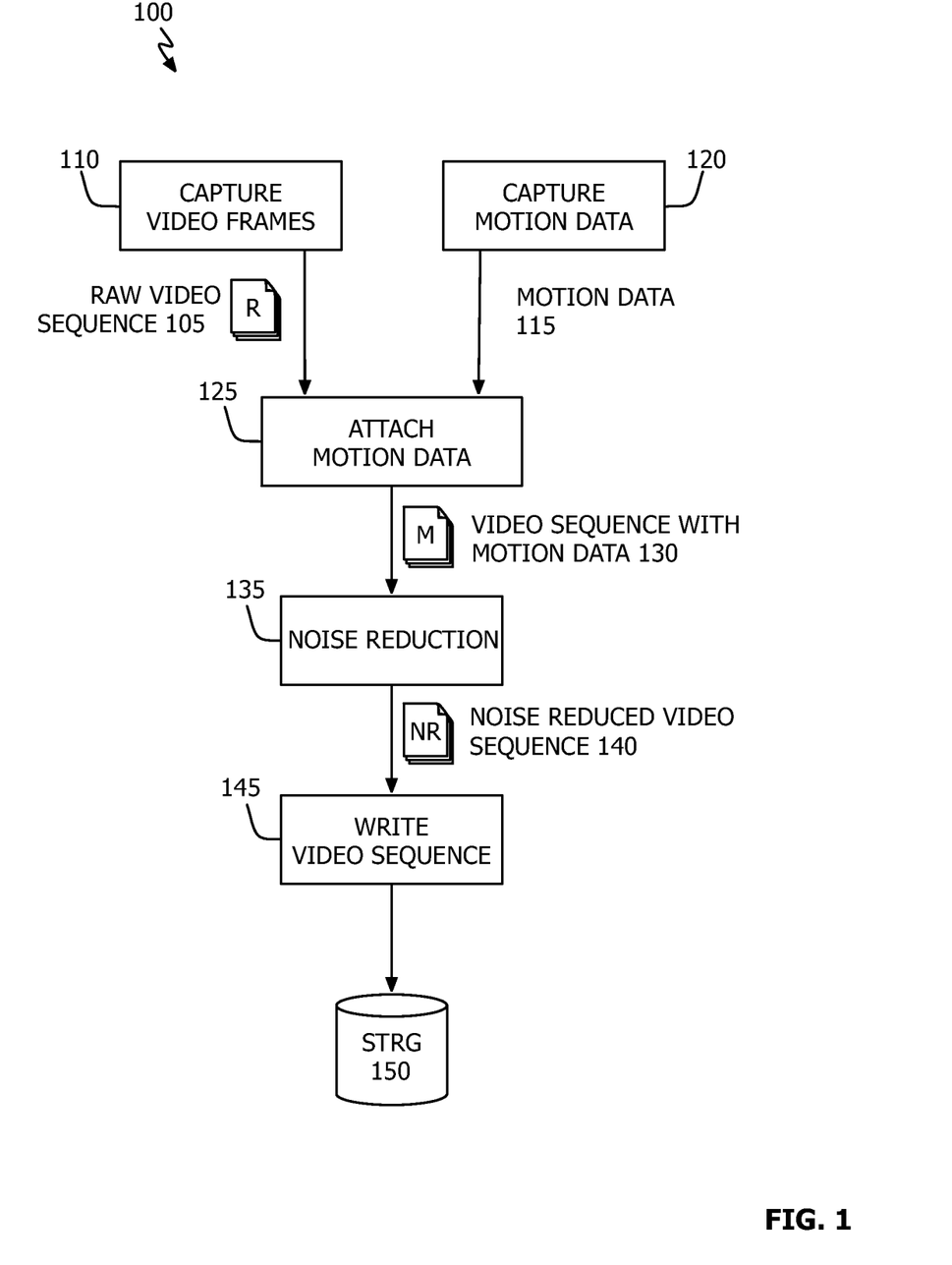
FIG. 1 illustrates an exemplary method for noise reduction in accordance with an embodiment of the present invention.

FIG. 1 illustrates an exemplary method 100 for noise reduction in accordance with an embodiment of the present invention. As shown in FIG. 1, noise reduction for a video sequence may begin by capturing a raw video sequence 105 (block 110) and corresponding motion data 115 (block 120). The motion data may correspond to the motion of an image sensor capturing the sequence of images and/or the device including the image sensor. The captured motion information 115 may then be associated with individual frames within raw video sequence 105 (block 125) to produce a video sequence 130 with motion data. Frames within video sequence 130 may then be transformed based on various motion estimates made for multiple segments in each of the frames comprising video sequence 130 to reduce the effects of noise (block 135). The result is a noise-reduced video sequence 140 that may be written (block 145) to storage 150.

Capturing the motion data for each frame in raw video sequence 105 provides each captured frame a corresponding motion datum. Each frame in a video sequence such as raw video sequence 105, may include a timestamp indicating when the particular frame was captured and the readout speed of the image sensor (e.g., during acts in accordance with block 120).

Figure 2A:
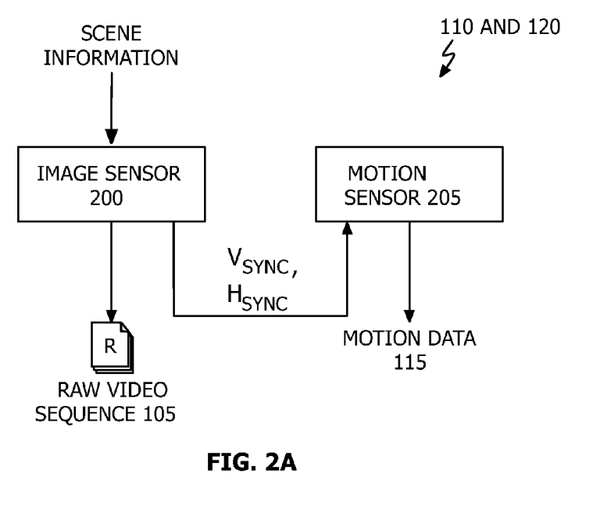
FIGS. 2A and 2B are simple block diagrams illustrating exemplary motion and video capture systems according to embodiments of the present invention.
Figure 2B:
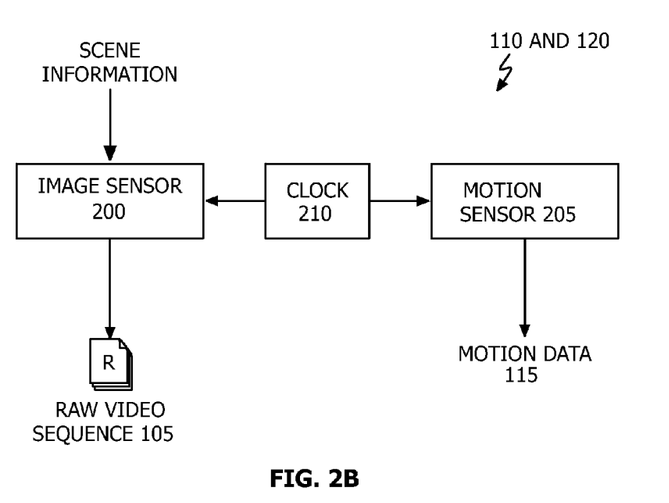

FIGS. 2A and 2B are simple block diagrams illustrating an exemplary motion and video capture system (blocks 110 and 120 shown in FIG. 1) according to embodiments of the present invention. As shown in FIG. 2A, in one embodiment video capture operation 110 may be performed by image sensor 200, and motion data capture operation 110 may be performed by motion sensor 205. The image sensor 200 may provide black and white or color images and use, for example, complementary metal-oxide semiconductor (CMOS) technology. The motion sensor 205 may generate rate data in three dimensions, e.g., (x, y, z) or (pitch, roll, yaw), or in a quaternion system. The motion sensor 205 may use any desired technology such as a gyro, accelerometers, or micro-electromechanical systems (MEMS) technology.

Video captured in accordance with block 110 (e.g., by image sensor 200) and motion data captured in accordance with block 120 (e.g., by motion sensor 205) may be correlated. An image captured at time $t_0$ be synchronized with motion data captured at approximately the same time. In the embodiment illustrated in FIG. 2A, image sensor 200 may signal the motion sensor 205 each time an image row is captured via, for example, the $V_{sync}$ and $H_{sync}$ signals. The motion sensor 205, in turn, may output motion data every time a $V_{sync}$ or $H_{sync}$ signal is received. This may permit each frame in raw video sequence 105 to be correlated or associated with the corresponding motion data. In one embodiment the motion sensor 205 may operate on a different clock signal than the image sensor 200. In such an embodiment, a motion sample that immediately precedes or follows the $V_{sync}$ and $H_{sync}$ signals may be associated with the corresponding image data. As shown in FIG. 2B, in another embodiment, a common clock 210 may drive both the image sensor 200 and the motion sensor 205. This arrangement may permit the synchronous capture of images and motion data. In another embodiment, different multiples of the clock 210 may be used to drive the image sensor and the motion sensor 205. In another embodiment, the common clock 210 may be used to generate timestamps for the image sensor 200 and the motion sensor 205. In such an embodiment, the data acquisition of the image sensor and the motion sensor are asynchronous, but the timestamps are synchronized via common clock 210.

In one example, an image sensor may capture images at a rate of 30 frames per second while the motion sensor 205 may record motion samples at a higher rate. For example, some motion sensors may sample at a rate of 100 times per second. Thus, there may actually be a plurality of motion samples (6-7 motion samples in this example) for each and every image frame that is captured by the image sensor. The image sensors may be read out sequentially, e.g., from the top of the sensor to the bottom of the sensor. This read out process, although very rapid, does take some finite amount of time. Thus, and as will be described herein, for certain noise reduction techniques, the motion samples recorded by the motion sensor 205 may be correlated with certain representative rows of the image sensor.

Figure 3:
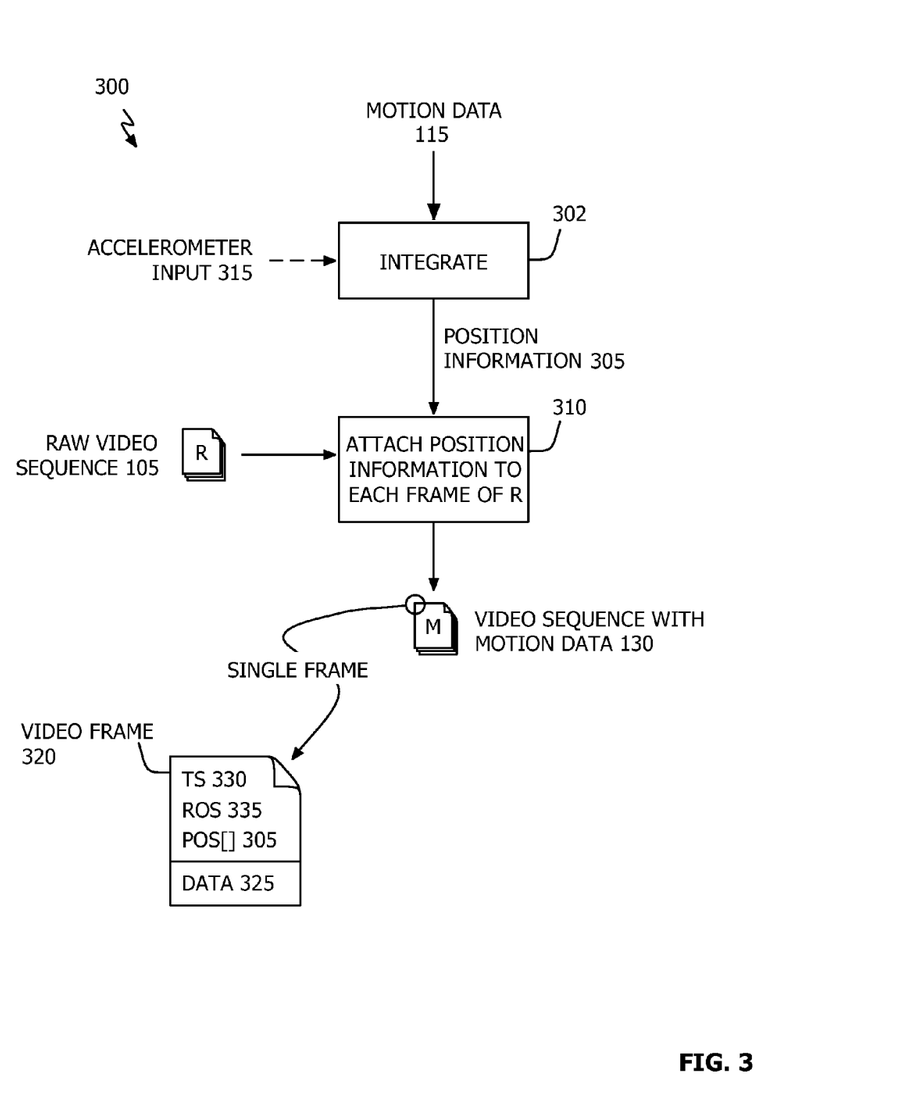
FIG. 3 illustrates an exemplary method for processing and attaching motion data to video data, in accordance with an embodiment of the present invention.

FIG. 3 illustrates an exemplary method 300 for associating motion data (block 125 in FIG. 1) to video data, in accordance with an embodiment of the present invention. As shown in FIG. 3, motion data 115 may be attached to the video data (raw video sequence 105). In this embodiment, the motion sensor may provide rate information, representing the rate at which the video capture device is being moved in, for example, each of 3 axes. Rate data may be integrated (block 302) to produce instantaneous position information 305 (also in each of 3 axes). Using image timestamp information and motion detector tags (which may also employ timestamps), each frame in these raw video sequence 105 may be associated with the appropriate position information 305 (block 310). According to an aspect of an embodiment, attaching motion data (block 125 in FIG. 1) may also use accelerometer input 315 to assist in calibrating motion sensor 205's output and to remove drifting.

Also shown in FIG. 3 is a high-level representation of a single image frame 320 from video sequence 130. As shown, video frame 310 may include data 325 representing the image data itself (e.g., comprising a plurality of image segments making up the image frame, wherein each image segment comprises a plurality of rows of pixel data), a timestamp of the first row 330, and the rolling shutter readout speed 335 of the image sensor, which together provide information to derive the times at which the various rows of the image frame were read out from the image sensor in accordance with block 120. After the attach operation 310, video frame 310 may also include an array of position information 305 (i.e., motion data), wherein each positional information sample corresponds to the position of the image capture device at a particular point in time during the read out of the various rows of the image sensor in accordance with block 110, shown in FIG. 1.

Figure 4:
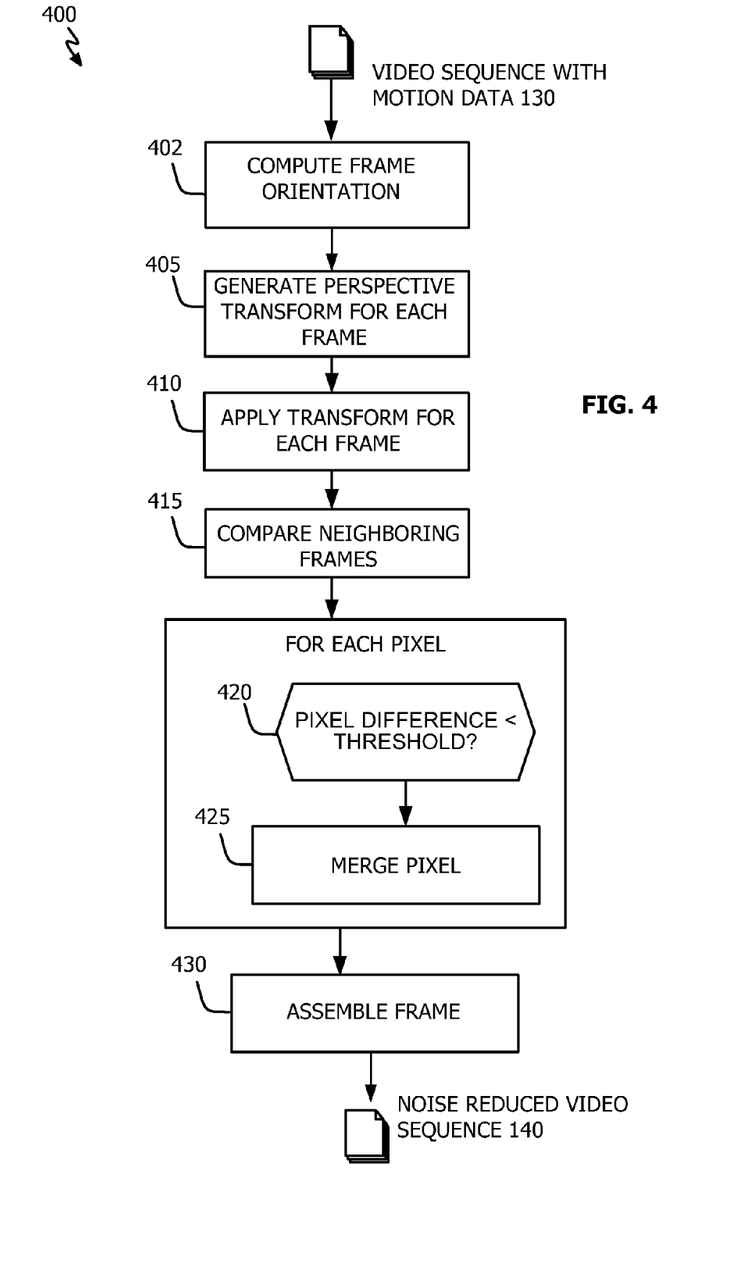
FIG. 4 illustrates an exemplary method for noise reduction in accordance with an embodiment of the present invention.

FIG. 4 illustrates an exemplary method 400 for noise reduction (block 135 in FIG. 1) in accordance with an embodiment of the present invention. The method may include computing frame orientation using motion data associated with images of a video sequence. The frame orientation and the motion data may be used to generate a perspective transform for each frame. The frames with the applied transform may be compared to determine noise in the transformed frames. The determination of the noise may include comparing the degree of difference between corresponding pixels in one or more adjacent frames. The images may be processed to reduce the noise. The noise may be reduced by merging the corresponding pixels determined to have noise in the one or more adjacent frames.

As shown in FIG. 4, a video sequence with attached motion data 130 as described herein may be received by a noise reduction unit. Combining the knowledge of the timestamp for the beginning of a captured frame with the knowledge of the readout speed of the image sensor, the capture time for a particular row and the frame orientation can be determined (block 402). In an embodiment, an exemplary motion sensor may have a sampling rate of 100 Hz, meaning that it reports a positional information sample readout every 5 ms. Once a capture time for a particular row is known, the base motion for the row may be calculated based on the interpolation of the recorded positional sensor information having timestamps corresponding most closely to the timestamp of the particular row. According to an aspect of an embodiment, to calculate the orientation of a frame, a single row, for example the center row of the frame may be used.

Once the orientation has been calculated for a row in each frame, the correction motion between frames may be determined to compensate for the orientation difference. The correction motion along each axis (e.g., x, y, z) may then be collected into a single 3×3 correction motion rotation matrix. Hereinafter, the correction motion matrix for each frame will be represented as rotation matrix $[R_i]$, where the subscript 'i' represents or identifies the current frame a. Following this, a 2D perspective transform matrix may be calculated and applied independently to each row of the image frame.

Once the correction motion for each segment of the image frame has been determined, it may be used to generate a perspective transformation (block 405) for each frame. The transform may then be applied to each frame (block 410). Then two or more transformed, temporally adjacent frames may be compared (block 415) and noise existent in the frames smoothed (blocks 420 and 425). Adjacent frames may be compared on a pixel-by-pixel basis or by comparing co-located pixel-blocks in the frames. Adjacent frames may have substantially the same content such that small differences in pixel values may be inferred to be noise induced by the system. However, large differences may signal an edge in motion or scene change. Therefore, large differences between frames may be preserved whereas small differences may be merged away or averaged to reduce the difference between frames due to noise.

Accordingly, if two co-located pixels in adjacent frames are compared and the difference between the pixels is less than a predetermined threshold (block 420), the value of the pixel in the frame in later display order may be merged with the value of the co-located pixel of the earlier frame (block 425). The pixel values may be merged according to any of a variety of methods including, for example, averaging the pixel values. However, if the difference between the co-located pixels is greater than a predetermined threshold (block 420), the value of the pixel in each frame may be unchanged. The merged pixels and the unchanged pixels may then be assembled into a corrected frame (block 430).

Figure 5:
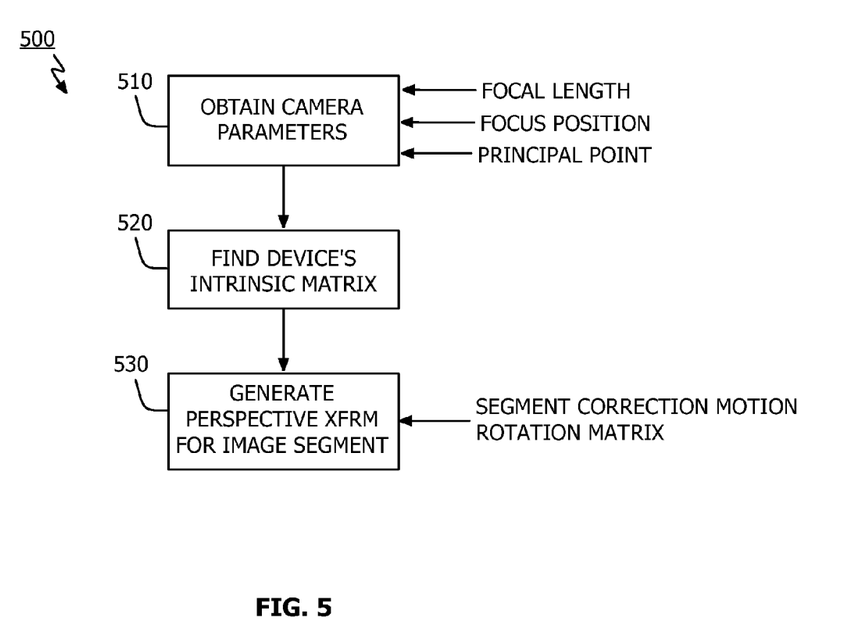
FIG. 5 illustrates an exemplary method for generating a perspective transformation, in accordance with an embodiment of the present invention.

FIG. 5 illustrates an exemplary method 500 for generating a perspective transformation, in accordance with an embodiment of the present invention. As shown in FIG. 5, in one embodiment, perspective transformation determination in accordance with block 405 shown in FIG. 4 begins by obtaining various image capture device parameter values (block 510). Illustrative parameters may include the focal length and focus position used to capture a frame and the image capture device's principal point. On image capture devices that provide the capability to move their lens and/or image sensor assemblies, the focus position may change from frame to frame. Based on the obtained parameters' values, the device's intrinsic matrix may be found or generated (block 520). A perspective transformation may then be determined for a particular image segment using the image capture device's intrinsic matrix associated with that frame (i.e., the intrinsic matrix generated using device parameter values that were in place when the frame was captured) and the frame's correction motion rotation matrix identified above (block 530).

A perspective transformation for a particular image segment within a given frame may be derived as follows. First, the 2D projection of real-space (which is 3D) onto an image sensor array (which is 2D) may be given as $$\begin{pmatrix} x \\ y \\ z \end{pmatrix} = \Pi \begin{pmatrix} X \\ Y \\ Z \end{pmatrix}, \quad \text{EQ. 1}$$

where $$\begin{pmatrix} X \\ Y \\ Z \end{pmatrix}$$

represents a point in real-space, $\Pi$ represents the image capture device's intrinsic matrix and $$\begin{pmatrix} x \\ y \\ z \end{pmatrix}$$

represents the 2D projection of the real-space point onto the image sensor's plane. In essence, EQ. 1 represents a 3D-to-2D transformation.

A novel use of this known relationship is to determine $$\begin{pmatrix} X \\ Y \\ Z \end{pmatrix} = \Pi^{-1} \begin{pmatrix} x \\ y \\ z \end{pmatrix}, \quad \text{EQ. 2}$$

where $$\begin{pmatrix} x \\ y \\ z \end{pmatrix}$$

represents a point in the sensor's 2D plane, $$\begin{pmatrix} X \\ Y \\ Z \end{pmatrix}$$

represents an estimate of where that point is in real-space, and $\Pi^{-1}$ represents the inverse of the image capture device's intrinsic matrix described above with respect to EQ 1. Thus, EQ. 1 represents a 2D-to-3D transformation estimator.

Based on the discussion above, the location of the a point after the estimated unwanted motion has been removed can be represented by $$\begin{pmatrix} X'_1 \\ Y'_1 \\ Z'_1 \end{pmatrix} = [R_i] \begin{pmatrix} X_1 \\ Y_1 \\ Z_1 \end{pmatrix}, \quad \text{EQ. 3}$$

where $$\begin{pmatrix} X_1 \\ Y_1 \\ Z_1 \end{pmatrix}$$

represents the real-space location of a point at time t1, $[R_i]$ the rotation matrix for frame i, and $$\begin{pmatrix} X'_1 \\ Y'_1 \\ Z'_1 \end{pmatrix}$$

represents the location of the same point after the estimated unwanted motion has been removed.

From EQ. 1 we may obtain $$\begin{pmatrix} X_1 \\ Y_1 \\ Z_1 \end{pmatrix} = \Pi_1^{-1} \begin{pmatrix} x_1 \\ y_1 \\ z_1 \end{pmatrix}, \quad \text{EQ. 4}$$

where $\Pi_1^{-1}$ represents the inverse of the image capture device's intrinsic matrix at time t1. Substituting EQ. 4 into EQ. 3 yields $$\begin{pmatrix} X_1' \\ Y_1' \\ Z_1' \end{pmatrix} = [R_i]\Pi_1^{-1}\begin{pmatrix} x_1 \\ y_1 \\ z_1 \end{pmatrix}. \qquad \text{EQ. 5}$$

From EQ. 1 we may obtain $$\begin{pmatrix} X_1' \\ Y_1' \\ Z_1' \end{pmatrix} = \Pi_1^{-1}\begin{pmatrix} x_1' \\ y_1' \\ z_1' \end{pmatrix}. \qquad \text{EQ. 6}$$

Substituting EQ. 6 into EQ. 5 yields $$\Pi_1^{-1}\begin{pmatrix} x_1' \\ y_1' \\ z_1' \end{pmatrix} = [R_i]\Pi_1^{-1}\begin{pmatrix} x_1 \\ y_1 \\ z_1 \end{pmatrix}. \qquad \text{EQ. 7}$$

Multiplying EQ. 7 by yields $$\Pi_1\Pi_1^{-1}\begin{pmatrix} x_1' \\ y_1' \\ z_1' \end{pmatrix} = \Pi_1[R_i]\Pi_1^{-1}\begin{pmatrix} x_1 \\ y_1 \\ z_1 \end{pmatrix}, \qquad \text{EQ. 8}$$

which may be rewritten as $$\begin{pmatrix} x_1' \\ y_1' \\ z_1' \end{pmatrix} = \Pi_1[R_i]\Pi_1^{-1}\begin{pmatrix} x_1 \\ y_1 \\ z_1 \end{pmatrix}. \qquad \text{EQ. 9}$$

which may be further rewritten as $$\begin{pmatrix} x_1' \\ y_1' \\ z_1' \end{pmatrix} = [P_i]\begin{pmatrix} x1 \\ y1 \\ z1 \end{pmatrix}, \qquad \text{EQ. 10}$$

where [$P_i$] represents the perspective transformation of frame i. Equations 9 and 10 describe how to correct motion from rows comprising a particular frame as reflected in rotation matrix [$R_i$]. Using homogeneous coordinates, the input z1 can be set to 1, and the final 2D output coordinates can be derived as $x_1'/z_1'$ and $y_1'/z_1'$. More particularly, perspective transformation [$P_i$] is based solely on the image capture device's parameter values (e.g., focal length and focus position) and determination of the image's correction motion component. This information is available from motion sensor 205 (e.g., a gyrometer). This information is computationally inexpensive to obtain and process, allowing noise reduction operations in accordance with this disclosure to be performed quickly and at low computational cost.

Figure 6A:
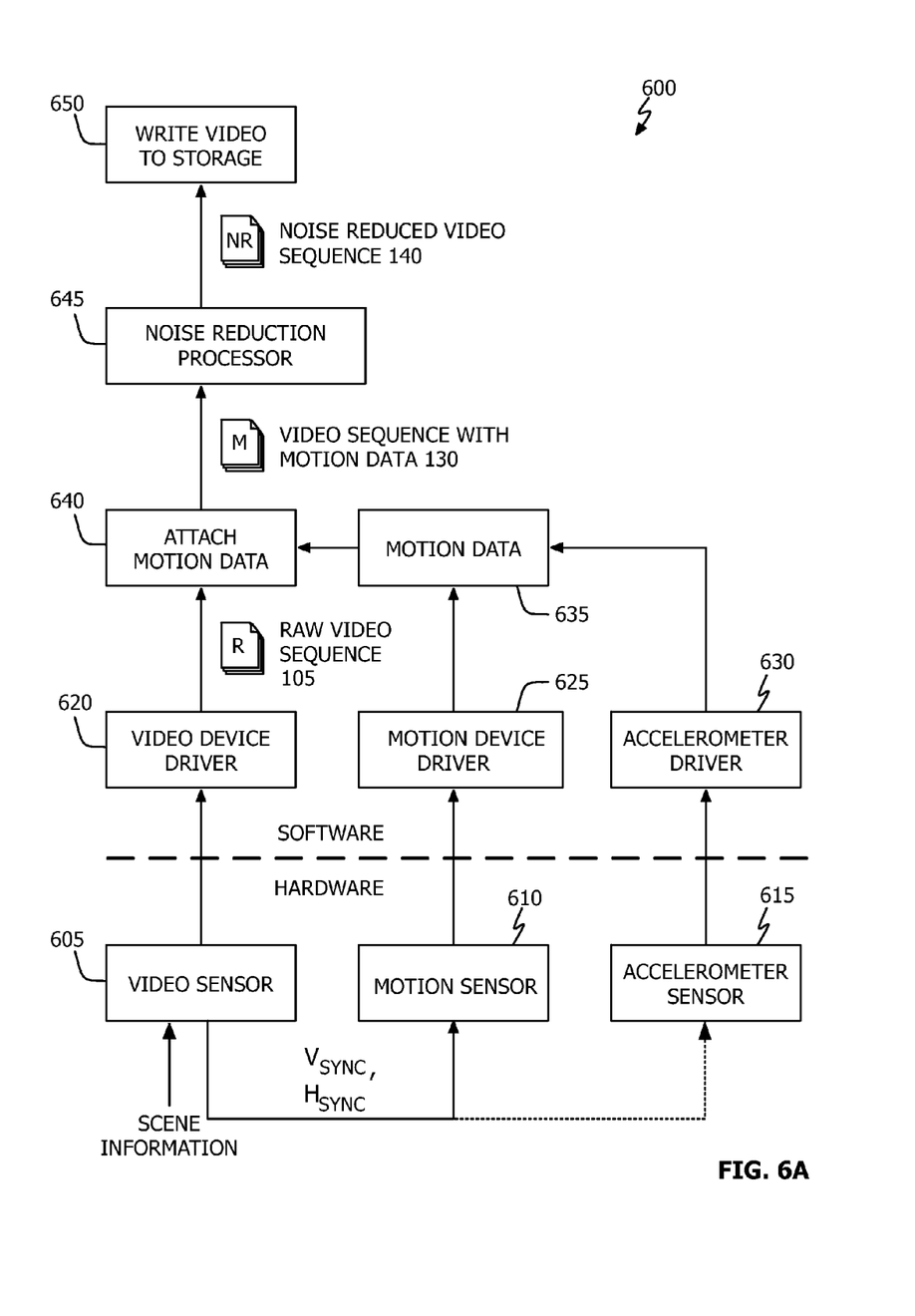
FIGS. 6A and 6B illustrate a block diagram of devices for providing noise reduction, in accordance with an embodiment of the present invention.
Figure 6B:
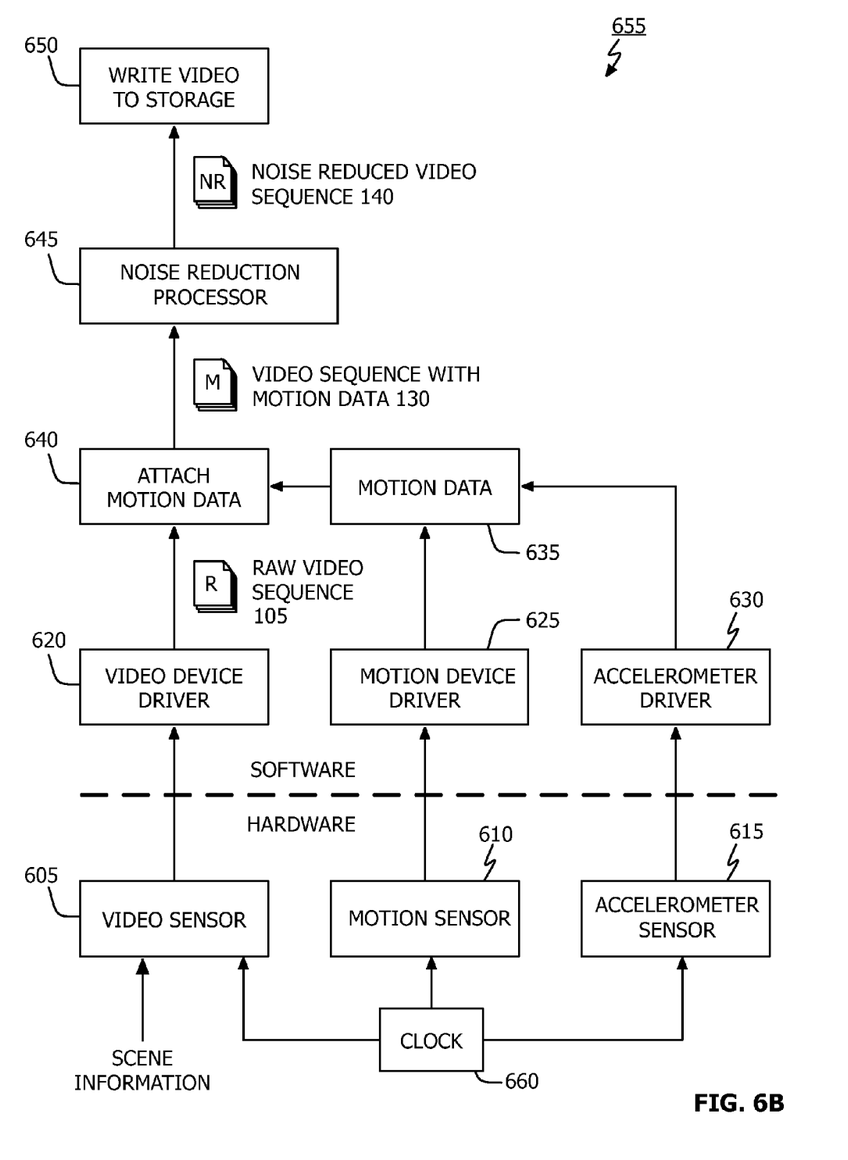

FIGS. 6A and 6B illustrate a block diagram of devices for providing noise reduction, in accordance with an embodiment of the present invention. Referring to FIG. 6A, a functional view of illustrative electronic device 600 in accordance with this disclosure may include a video sensor 605 (also referred to herein as a sensor array, or image sensor), and one or more of a motion sensor 610 (e.g., gyro sensor), and an accelerometer 615. Video sensor 605 may provide video frames to a video device driver 620, the motion sensor 610 may provide motion data (e.g., rate of movement) to motion device driver 625, and the accelerometer 615 may provide its data to accelerometer driver 630. In the example of FIG. 6A, rows of the video frames and motion data may be correlated through the use of Vsync and Hsync signals as discussed above with respect to FIG. 3A. Motion sensor and accelerometer data may be collected to generate motion data 635 which may then be attached 640 to the individual frames within raw video sequence 105. Once motion data has been attached, motion augmented video sequence 130 may be sent to noise reduction processor 645 which may transform each image segment of each frame in accordance with its particular perspective transformation and may merge the frames to reduce noise as described herein. Noise reduced video sequence 140 may then be written to storage 650.

In the embodiment of the video capture device 655 shown in FIG. 6B, a common clock 660 may drive a video 605, and one or more of a motion sensor 610 and an accelerometer sensor 615. As noted above with respect to FIG. 3B, use of common clock 660 may permit synchronous capture of image and motion data. In another alternative embodiment (not shown), a common timer (or two distinct timers driven by a common clock) may be used to add timestamps to video frames and motion samples. Specifically, video frames and motion samples may be generated with different clocks, but they may be timestamped by a common clock, or two timers driven by a common clock. In such an embodiment, the data acquisition may be asynchronous, but the timestamps would be synchronized to a common clock.

Figure 7:
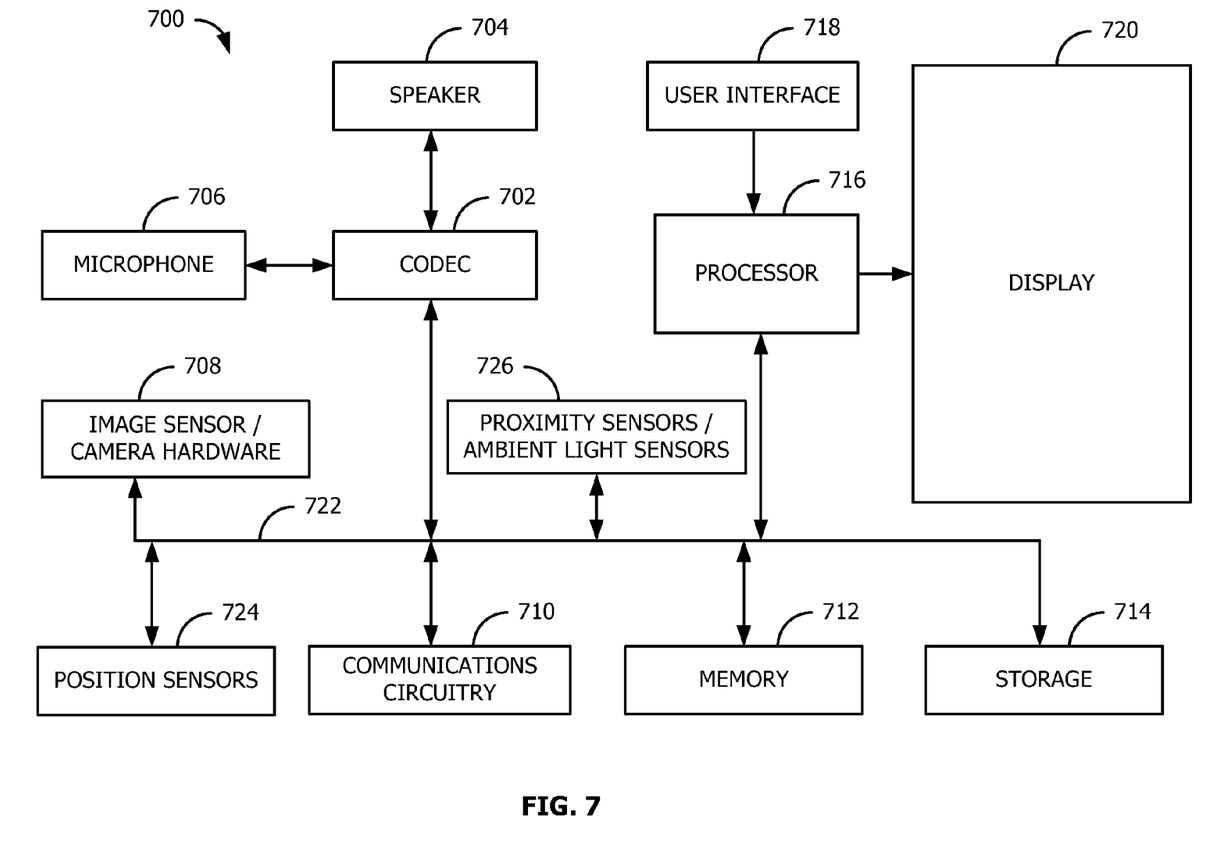
FIG. 7 shows, in block diagram form, an electronic device, in accordance with an embodiment of the present invention.

Referring now to FIG. 7, a simplified functional block diagram of a representative electronic device possessing a display 700 according to an illustrative embodiment, e.g., electronic image capture device 70, is shown. The electronic device 700 may include a processor 716, a display 720, a proximity sensor/ambient light sensor 716, a microphone 706, audio/video codecs 701, a speaker 704, communications circuitry 710, position sensors 724 (e.g., accelerometers and/or gyrometers), an image sensor with associated camera hardware 708, a user interface 718, a memory 711, a storage device 714, and a communications bus 711. The processor 716 may be any suitable programmable control device and may control the operation of many functions, such as the generation and/or processing of image metadata, as well as other functions performed by electronic device 700. The processor 716 may drive display 720 and may receive user inputs from the user interface 718. The processor 716 may be any suitable programmable control device or general or special purpose processor or integrated circuit and may execute instructions necessary to carry out or control the operation of many functions, such as the generation and/or processing of image metadata, as well as other functions performed by electronic device 700. The processor 716 may, for example, be a system-on-chip, such as an applications processor found in a mobile device or a dedicated GPU and may, for example, be based upon a RISC, CISC or any other suitable architecture and may include one or more processing cores.

The storage device 714 may store media (e.g., image and video files), software (e.g., for implementing various functions on device 700), preference information, device profile information, and any other suitable data. The storage device 714 may include one more storage mediums for tangibly recording image data and program instructions, including for example, a hard-drive, permanent memory such as ROM, semi-permanent memory such as RAM, or cache. The program instructions may comprise a software implementation encoded in any desired language (e.g., C or C++).

The memory 711 may include one or more different types of memory which may be used for performing device functions. For example, the memory 711 may include cache, ROM, and/or RAM. The communications bus 711 may provide a data transfer path for transferring data to, from, or between at least the storage device 714, the memory 711, and the processor 716. The user interface 718 may allow a user to interact with the electronic device 700. For example, the user input device 718 can take a variety of forms, such as a button, keypad, dial, a click wheel, or a touch screen.

In one embodiment, the personal electronic device 700 may be an electronic device capable of processing and displaying media such as image and video files. For example, the personal electronic device 700 may be a device such as such a mobile phone, personal data assistant (PDA), portable music player, monitor, television, laptop, desktop, and tablet computer, or other suitable personal device.

The foregoing description of preferred and other embodiments is not intended to limit or restrict the scope or applicability of the inventive concepts conceived of by the Applicant. As one example, although the present disclosure focused on handheld personal electronic image capture devices, it will be appreciated that the teachings of the present disclosure can be applied to other implementations, such as traditional digital cameras. The techniques disclosed herein are applicable to any number of electronic devices with optical sensors and/or positional sensors, such as digital cameras, digital video cameras, mobile phones, personal data assistants (PDAs), portable music players, as well as laptop and tablet computer systems.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the disclosed embodiments. Other applications of the present invention may be embodied as a hybrid system of dedicated hardware and software components.

The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

In the above description, for purposes of explanation, numerous specific details have been set forth in order to provide a thorough understanding of the inventive concepts. As part of this description, some structures and devices may have been shown in block diagram form in order to avoid obscuring the invention. Reference in the specification to "one embodiment" or "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system and business related constraints), and that these goals will vary from one implementation to another. It will also be appreciated that such development efforts might be complex and time consuming, but would nevertheless be a routine undertaking for those of ordinary skill in the digital video capture and processing field having the benefit of this disclosure.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

It is to be understood that the above description is intended to be illustrative, and not restrictive. For example, the above described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

I claim:

1. A method for reducing noise in a sequence of frames, comprising:
    generating a transformed frame from an input frame according to a perspective transform of a transform matrix, wherein the transform matrix corrects for motion associated with input frame; and
    identifying pixels in the transformed frame that have a difference with corresponding pixels in a neighboring frame below a threshold; and
    generating an output frame by adjusting pixels in the transformed frame that are identified to have the difference with the corresponding pixels in the neighboring frame below the threshold.

2. The method of claim 1, wherein adjusting the pixels in the transformed frame includes merging the pixel with a corresponding pixel of the neighboring frame.

3. The method of claim 1, wherein the adjusting includes smoothing the pixels.

4. The method of claim 1, further comprises computing the motion of the frame using motion data from a motion sensor.

5. The method of claim 4, wherein multiple samples of motion data are captured for each input frame.

6. The method of claim 4, wherein the motion sensor generates the motion data in response to a signal corresponding to the capture of the input frame by an image sensor.

7. The method of claim 1, further comprises generating a clock signal to control the capture of the input frame by an image sensor and the capture of motion data by a motion sensor.

8. The method of claim 1, wherein the transform matrix is determined by using the intrinsic camera parameters used to capture the input frame.

9. A method for reducing noise in a frame of an image or video sequence, comprising:
    generating perspective transform for the frame to compensate for frame motion;
    applying the transform to the frame;

comparing the transformed frame to a preceding frame, to determine if one or more corresponding pixels of the frames have a difference below a threshold; and merging one or more corresponding pixels from the transformed frame and the preceding frame if it is determined that the difference between the one or more corresponding pixels of the frames is below a threshold.

10. The method of claim 9, further comprises computing frame orientation using motion data to determine frame motion.

11. The method of claim 10, further comprises generating motion data by a motion sensor in response to a signal corresponding to the capture of an image frame by an image sensor.

12. The method of claim 9, further comprises generating a clock signal to control the capture of the frame by an image sensor and the capture of motion data by a motion sensor.

13. The method of claim 9, wherein the perspective transform is determined by using the intrinsic camera parameters and frame motion.

14. A non-transitory computer-readable storage device storing computer-executable instructions that, when executed, cause a computer to execute a method comprising:

generating perspective transform for the frame to compensate for frame motion;

applying the transform to the frame;

comparing the transformed frame to a preceding frame, to determine if one or more corresponding pixels of the frames have a difference below a threshold; and merging one or more corresponding pixels from the transformed frame and the preceding frame if it is determined that the difference between the one or more corresponding pixels of the frames is below a threshold.

15. A method for reducing noise in a captured image, comprising:

acquiring motion data from a positional sensor in communication with an image capture device;

calculating a 2D-perspective transform matrix for the captured frame based on motion data and camera parameters;

applying the calculated perspective transform matrix to the frame to generate a corrected frame;

comparing the corrected frame to a neighboring frame to identify edges;

merging pixels of the corrected frame and the neighboring frame based on the edge detection; and assembling the plurality of merged pixels to provide a corrected output image.

16. The method of claim 15, wherein merging pixels of the corrected frame and the neighboring frame based on the edge detecting includes merging pixels that are not determined to be edges.

17. The method of claim 15, wherein comparing the corrected frame to the neighboring frame to identify edges includes determining pixels in the corrected frame that have a difference with corresponding pixels in a neighboring frame below a threshold.

18. The method of claim 15, wherein merging includes averaging the pixel values.

19. An apparatus comprising:

a camera to capture a video sequence;

a memory to store an output frame; and a controller configured to:

compute motion of the camera for the frame;

calculate a transform matrix to correct for the motion of the camera;

generating a transformed frame from a frame of the video sequence according to the transform matrix;

determining pixels in the transformed frame that have a difference with corresponding pixels in a neighboring frame below a threshold;

generating the output frame by adjusting pixels in the transformed frame that are determined to have the difference with the corresponding pixels in the neighboring frame below the threshold; and storing the output frame in the memory.

20. A chip comprising:

a video device driver configured to receive a captured frame;

a motion sensor driver configured to receive motion data associated with the captured frame; and a noise reduction processor configured to:

generate a transformed frame from the input frame according to a perspective transform of a transform matrix based on the motion data; and generate an output frame by adjusting pixels in the transformed frame that are determined to have a difference with the corresponding pixels in the neighboring frame below a threshold.

21. The chip of claim 20, further comprising a transform calculator to determine the transform matrix using motion sensor data.

22. A video processing method, comprising:

capturing a raw video sequence comprising a plurality of frames by an image capture device;

capturing motion data representing motion of the image capture device for the frames of the raw video sequence by a motion sensing device;

transforming frames within the raw video sequence according to a perspective transform of a transform matrix, wherein the transform matrix corrects for motion associated with the raw video frame as reflected by the motion data;

identifying pixels in the transformed frame that have a difference with corresponding pixels in a neighboring frame below a threshold;

generating an output frame by adjusting pixels in the transformed frame that are identified to have the difference with the corresponding pixels in the neighboring frame below the threshold; and storing the output frames to a storage device.

23. The method of claim 22, wherein the image capture device and the motion capture device are contained in a common housing.

24. The method of claim 22, wherein the motion data is captured by an accelerometer.

25. The method of claim 22, wherein the motion data is captured by a gyrometer.

26. The method of claim 22, wherein adjusting the pixels in the transformed frame includes merging the pixel with a corresponding pixel of the neighboring frame.

27. The method of claim 22, wherein the adjusting includes smoothing the pixels.

28. The method of claim 22, further comprises computing the motion of the frame using motion data from a motion sensor.

29. The method of claim 28, wherein multiple samples of motion data are captured for each input frame.

30. The method of claim 28, wherein the motion sensor generates the motion data in response to a signal corresponding to the capture of the raw video frame by an image sensor.

31. The method of claim 22, further comprises generating a clock signal to control the capture of the raw video frame by an image sensor and the capture of motion data by a motion sensor.

32. The method of claim 22, wherein the transform matrix is determined by using intrinsic camera parameters used to capture the raw video frames.

33. A video processing method comprising:
- capturing a raw video sequence comprising a plurality of frames by an image capture device;
- capturing motion data representing motion of the image capture device for the frames of the raw video sequence by a motion sensing device;
- computing frame orientation using motion data associated with images of the raw video sequence;
- transforming frames within the raw video sequence according to a perspective transform of a transform matrix, wherein the transform matrix corrects for motion associated with the raw video frame as reflected by the motion data;
- identifying pixels in the transformed frame that have a difference with corresponding pixels in a neighboring frame below a threshold;
- generating an output frame by adjusting pixels in the transformed frame that are identified to have the difference with the corresponding pixels in the neighboring frame below the threshold; and
- storing the output frames to a storage device.

34. The method of claim 33, wherein the image capture device and the motion capture device are contained in a common housing.

35. A video processing method comprising:
- capturing a raw video sequence comprising a plurality of frames by an image capture device;
- capturing motion data representing motion of the image capture device for the frames of the raw video sequence by a motion sensing device;
- obtaining various image capture device parameter values;
- generating the intrinsic matrix of the image capture device based on one or more of the image capture device parameter values;
- generating a correction motion rotation matrix;
- generating a perspective transformation for the raw video frames using the image capture device's intrinsic matrix associated with the raw video frame and the raw video frame's correction motion rotation matrix;
- determining if pixels in the transformed frame that have a difference with corresponding pixels in a neighboring frame below a threshold;
- generating the output frame by adjusting pixels in the transformed frame that are determined to have the difference with the corresponding pixels in the neighboring frame below the threshold; and
- storing the output frames to a storage device..

36. The method of claim 35, wherein the various image capture device parameter values comprise one or more of focal length, focus position used to capture a frame, and/or the image capture device's principal point.

* * * * *